(12) United States Patent
Ting et al.

(10) Patent No.: US 7,880,478 B2
(45) Date of Patent: Feb. 1, 2011

(54) SENSING DEVICE FOR MEASURING A POSITION OF NANOSCALE MOTION APPARATUS

(75) Inventors: Yung Ting, Tao Yuan County (TW); Chun-Chung Li, Tao Yuan County (TW)

(73) Assignee: Chung-Yuan Christian University, Tao Yuan County (TW)

( * ) Notice: Subject to any disclaimer, the term of this patent is extended or adjusted under 35 U.S.C. 154(b) by 254 days.

(21) Appl. No.: 12/222,145

(22) Filed: Aug. 4, 2008

(65) Prior Publication Data
US 2010/0026320 A1    Feb. 4, 2010

(51) Int. Cl.
*G01R 27/26* (2006.01)
(52) U.S. Cl. .................................................. 324/662
(58) Field of Classification Search ................... 324/662
See application file for complete search history.

(56) References Cited
U.S. PATENT DOCUMENTS
2004/0126491 A1 * 7/2004 Tai et al. .................. 427/249.1

OTHER PUBLICATIONS

PI Hexapod Sis-Axis Parallel-Kinematics MicroMotion Robot (4 pages).*
Yung Ting et al, Task Space Measurement and Control For A 6DOF Stewart Nanoscale Platform, Proceedings of the 2007 IEEE International Conference on Mechatronics and Automation, Aug. 5, 2007 Harbin, China.

* cited by examiner

*Primary Examiner*—Vincent Q Nguyen
(74) *Attorney, Agent, or Firm*—Bacon & Thomas, PLLC

(57) ABSTRACT

A nanoscale motion apparatus includes a fixed base, a movable platform, and means for moving the movable platform connected between the fixed base and the movable platform. A sensing device includes a holder, at least two nanosensors, and a measurement plate. The holder is mounted on the fixed base. The nanosensors are configured on the holder. The measurement plate is mounted on the movable platform. The measurement plate can be sensed by the nanosensors so as to measure the corresponding variation between the fixed base and the movable platform.

8 Claims, 9 Drawing Sheets

SENSING DEVICE FOR MEASURING A POSITION OF NANOSCALE MOTION APPARATUS

FIELD OF THE INVENTION

The present invention relates to a sensing device for measuring a position of a nanoscale motion apparatus.

DESCRIPTION OF RELATED ART

High precision positioning technique has become very important for various application areas such as semiconductors, biomedical science, optics, and microscopy, and so on. Numerous micro or nanoscale platforms have been designed for those applications. Because of good characteristics for precision requirement, piezoelectric actuator is an ideal driving resource. Unavoidable errors creep in during mechanism manufacture and from assembly and nonlinearity of the piezoelectric-ceramic actuator are in general the primary difficulties for precision control.

The flexure hinge mechanism and the error compensation method were developed to cope with the manufacturing and assembly problems, and the hysteresis controller by using Preisach model was designed to solve the problem of nonlinear hysteresis effect.

Generally, forward kinematics of a parallel manipulator is very complicated and difficult to solve. Besides, the mentioned dynamic equations were accurate by including actuating legs having closed-loop connections to each other in its formulation, but computation of the dynamics was very time-consuming.

SUMMARY OF THE INVENTION

It is therefore an objective of the present invention to provide a sensing device for measuring a position of a nanoscale motion apparatus that can be designed much easier.

In accordance with the foregoing and other objectives of the present invention, a sensing device for measuring a position of a nanoscale motion apparatus is provided. The nanoscale motion apparatus comprises a fixed base, a movable platform, and means for moving the movable platform connected between the fixed base and the movable platform. The sensing device comprises a holder, at least two nanosensors, and a measurement plate. The holder is mounted on the fixed base. The nanosensors are configured on the holder. The measurement plate is mounted on the movable platform. The measurement plate can be sensed by the nanosensors so as to measure the corresponding variation between the fixed base and the movable platform.

Preferably, the nanosensors are capacitance probes for large and fine strokes.

In a preferred embodiment, the means for moving the movable platform comprises six legs driven by piezoelectric actuators. In this embodiment, there are total six nanosensors that can sense with six degrees of freedom. Preferably, the nanoscale motion apparatus is a parallel mechanism, such as a Stewart Platform.

In a preferred embodiment, the holder comprises a base portion fixed on the fixed base and a receiving portion fixed on the base portion. In this embodiment, the measurement plate comprises a protrusion, and the receiving portion comprises an indentation for receiving the protrusion. The receiving portion comprises at least two holes corresponding to the nanosensors. Accordingly, the nanosensors can sense the protrusion of the measurement plate when the movable platform is moving corresponding to the fixed base.

In another embodiment, the nanoscale motion apparatus can be a serial mechanism.

These and other features, aspects, and advantages of the present invention will become better understood with reference to the following description and appended claims. It is to be understood that both the foregoing general description and the following detailed description are by examples, and are intended to provide further explanation of the invention as claimed.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE PREFERRED EMBODIMENTS

Figure 1:
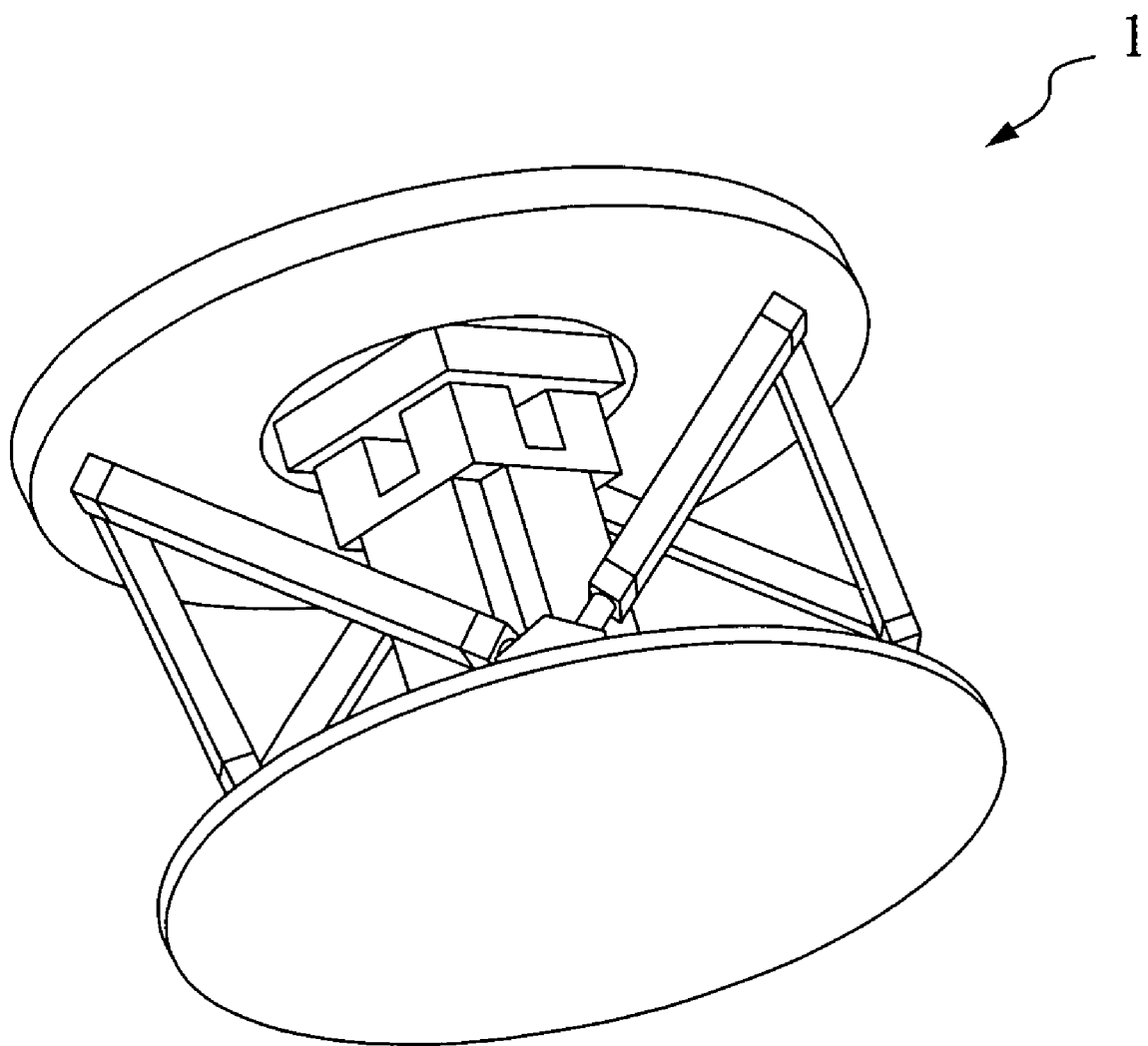
FIG. 1 shows an example of a nanoscale motion apparatus in accordance with the present invention.

Reference will now be made in detail to the present preferred embodiments of the invention, examples of which are illustrated in the accompanying drawings. Wherever possible, the same reference numbers are used in the drawings and the description to refer to the same or like parts.

Figure 2:
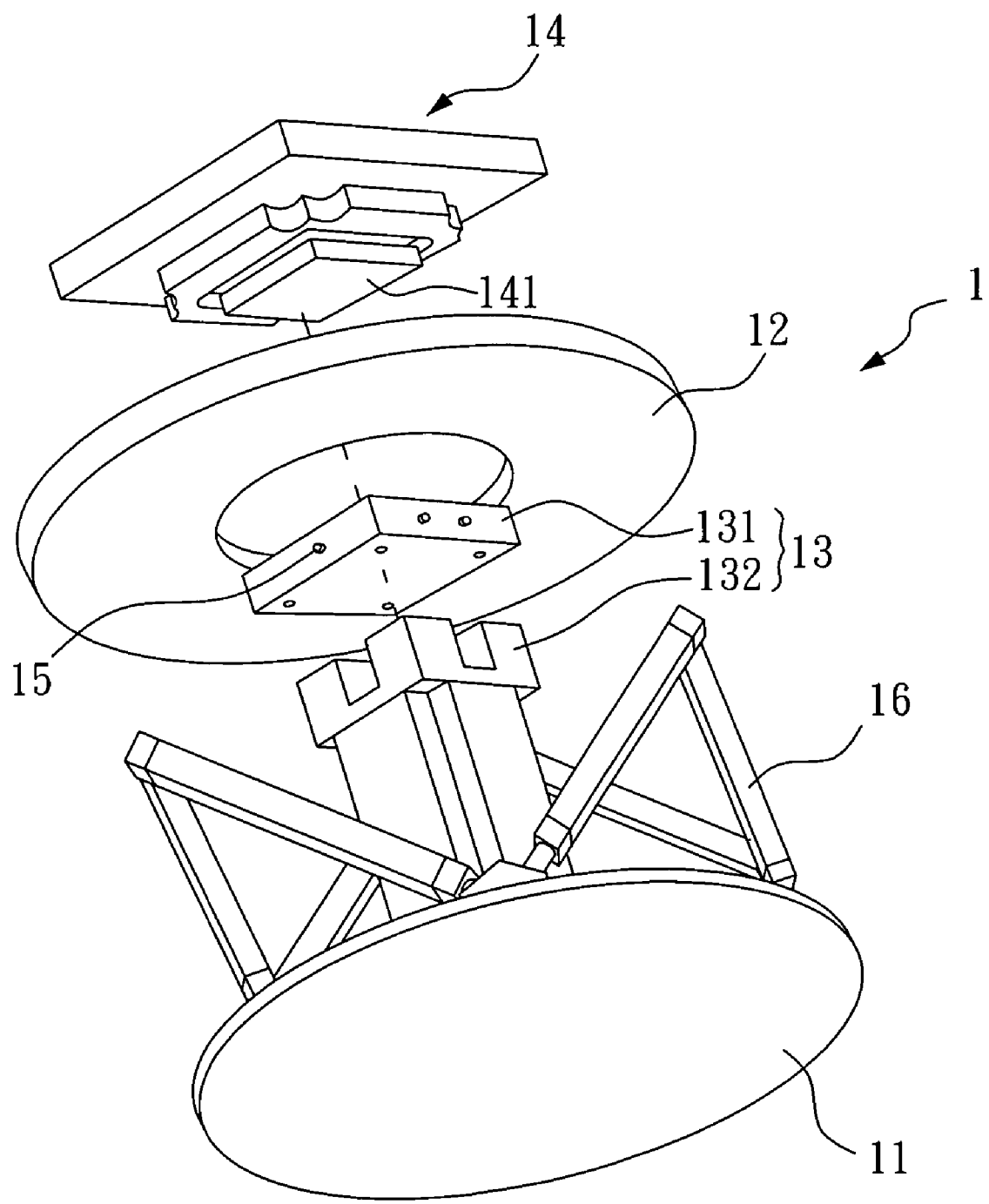
FIG. 2 shows the explosion perspective view of FIG. 1.

FIG. 1 shows an example of a nanoscale motion apparatus 1. As shown in FIG. 2, the nanoscale motion apparatus 1 comprises a fixed base 11, a movable platform 12, and means for moving the movable platform 12 connected between the fixed base 11 and the movable platform 12.

Figure 3A:
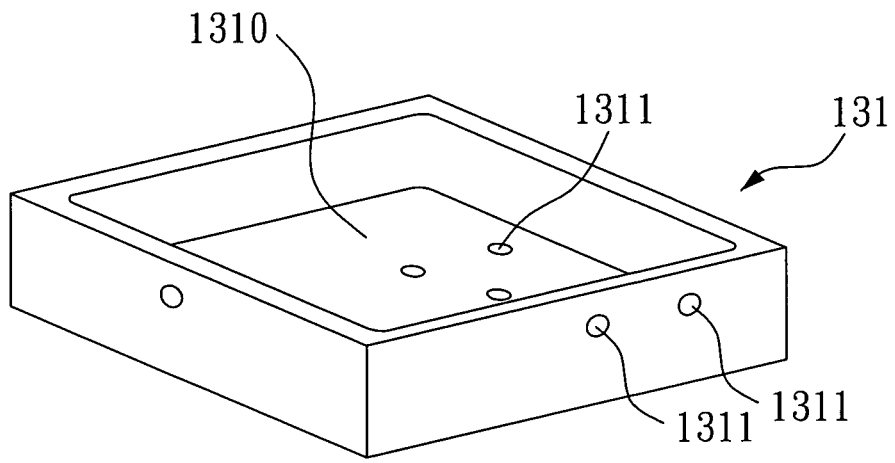
FIG. 3A-3C are various designs of the receiving portion of the holder in accordance with the present invention.

According to a sensing device of the present invention, a holder 13 is mounted on the fixed base 11. Preferably, the holder 13 comprises a base portion 132 fixed on the fixed base 11 and a receiving portion 131 fixed on the base portion 132. A measurement plate 14 according to the present invention of the sensing device is mounted on the movable platform 12. In one embodiment, the measurement plate 14 may comprise a protrusion 141. The receiving portion, as shown in FIG. 3A, comprises an indentation 1310 for receiving the protrusion 141 of the measurement plate 14. The protrusion 141 is a little bit away from the indentation 1310 without touching each other.

Figure 3B:
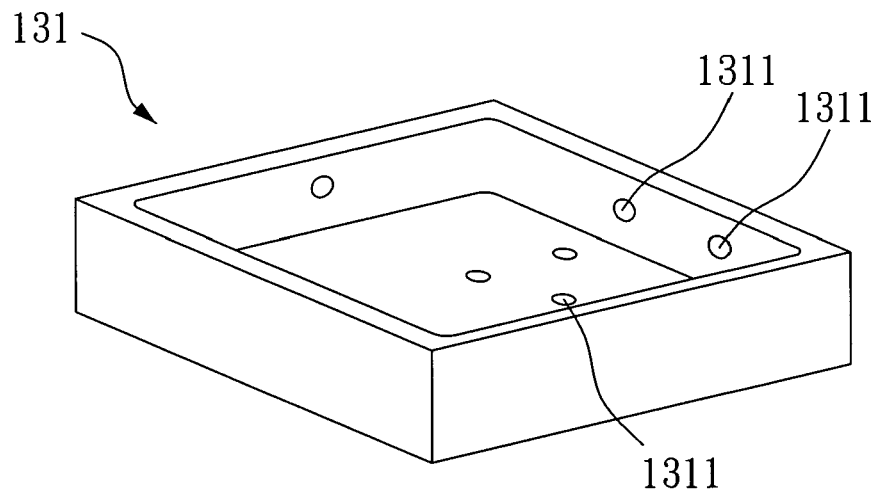
Figure 3C:
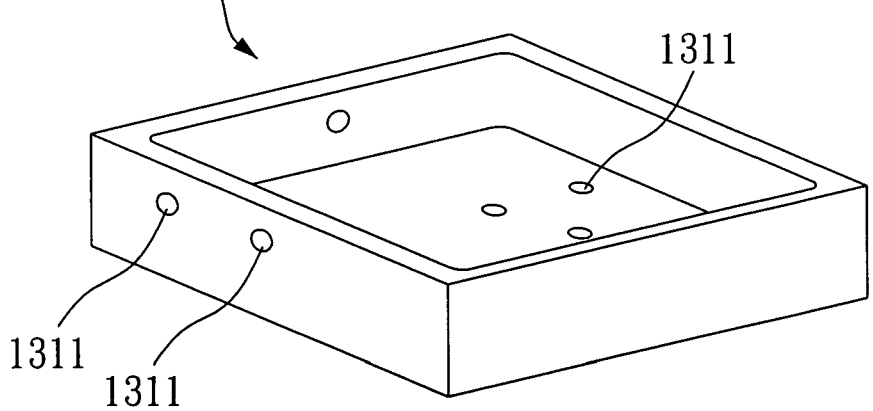

According to the present invention, at least two nanosensors are configured on the holder 13, which will be described in below. In a preferred embodiment, as shown in FIG. 3A, the receiving portion 131 comprises at least two holes 1311 corresponding to the nanosensors 15a-f (shown in FIG. 5A; or nanosensors 15 in FIG. 2). In another words, the nanosensors can be configured into the holes 1311, and one hole 1311 for one nanosensor 15. As shown in FIG. 3A-3B, it is apparent that the configuration of the holes 1311 can be designed in different location according different demand.

In order to measure large and fine stroke of the the position of the nanoscale motion apparatus 1, the nanosensors are capacitance probes, such as made by Lion Precision Company, Probe Model: C6-D, Driver Model: DMT22. The capacitance probes may provide resolution of 2.2 nm for large stroke in a range of 50 μm and resolution of 0.4 nm for fine stroke in a range of 10 μm.

In a preferred embodiment, the means for moving the movable platform 12 comprises six legs 16 driven by piezoelectric actuators (not shown). The nanoscale motion apparatus 1 is a parallel mechanism, such as a Stewart Platform. However, in another embodiment, the nanoscale motion apparatus may be a series mechanism. Each leg 16 driven by a stack type piezoelectric actuator (not shown) can reach a maximum longitudinal displacement of, for example, 127 μm with an input voltage up to 150 volts. The operating range of the leg 16 provides the motion of about (85,95,186) μm in the (x,y,z) directions and (688,595,630) μrad in the (yaw, pitch, roll) orientations respectively, for example.

Figure 4:
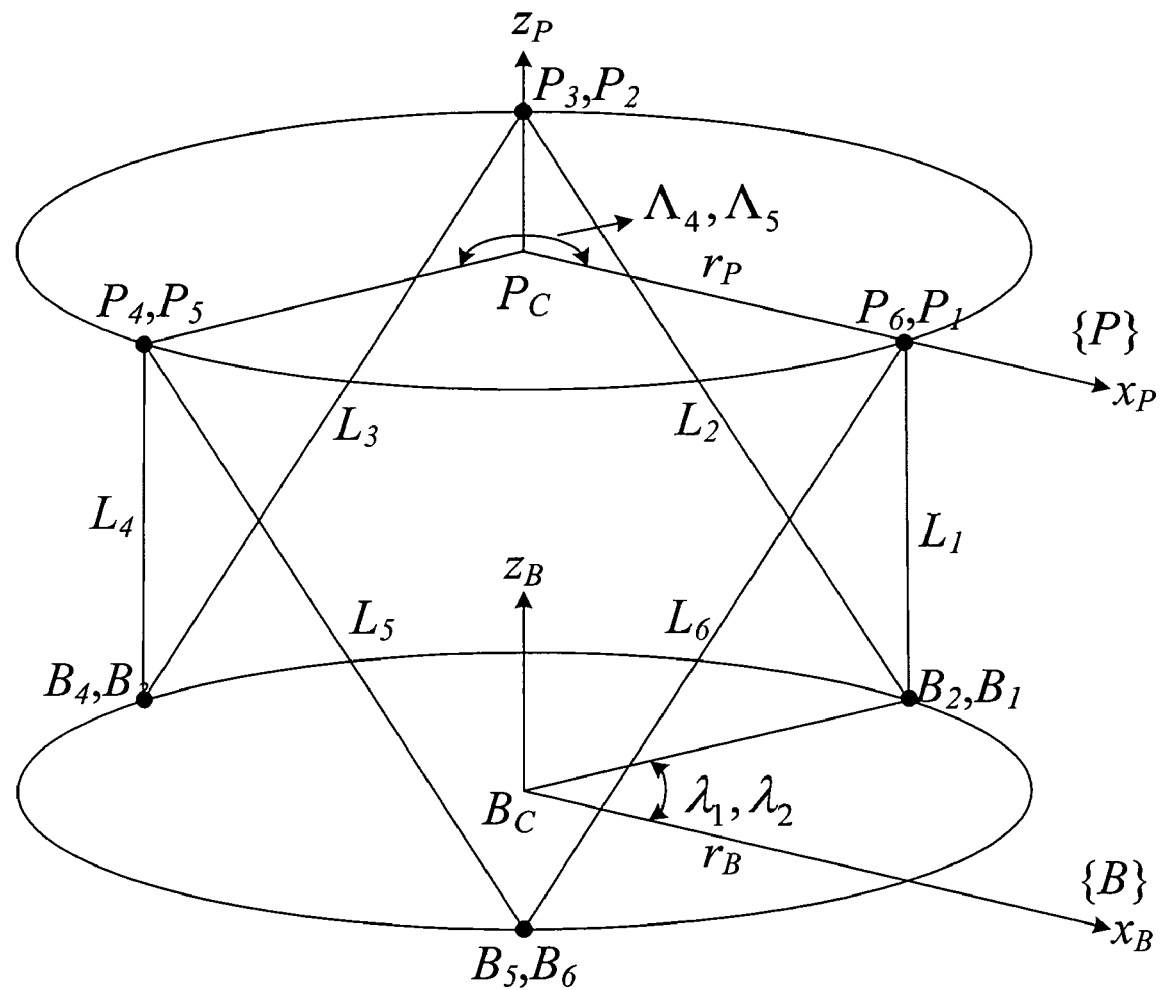
FIG. 4 shows a coordinate system of the nanoscale motion apparatus in accordance of the present invention.

In order to simplify the description, we use the Stewart Platform as an example (preferred embodiment). Furthermore, the nanosensors 15$a$-$f$ are configured in the holes 1311 as shown in FIG. 3A. The coordinate system of the nanoscale motion apparatus is shown in FIG. 4. Two coordinate frames {B} and {P} are assigned to the fixed base and the movable platform, respectively. The origin of each frame is located at the centroid {$B_C$, $P_C$} of the nanoscale motion apparatus. The radii of circumscribed upper and lower circles are denoted by $r_B$ and $r_P$, respectively. The angle $\lambda_i$ between $B_C B_i$ and $x_B$, and the angle $\Lambda_i$ between $P_C P_i$ and $x_P$ are given and expressed by the formulas (1) and (2):

$$\lambda_i = \left[ \frac{\pi}{3} \quad \frac{\pi}{3} \quad \pi \quad \pi \quad \frac{5\pi}{3} \quad \frac{5\pi}{3} \right] i = 1 \sim 6 \quad (1.)$$

$$\Lambda_i = \left[ 0 \quad \frac{2\pi}{3} \quad \frac{2\pi}{3} \quad \frac{4\pi}{3} \quad \frac{4\pi}{3} \quad 0 \right] i = 1 \sim 6 \quad (2.)$$

The pose of end-effector is defined by $h=[x\ y\ z\ \theta_x\ \theta_y\ \theta_z]^T$ in the task space, and the leg 16 is defined by $q=L=[L_1\ L_2\ L_3\ L_4\ L_5\ L_6]^T$ in the joint space, and both are mutually related by the forward kinematics and the inverse kinematics. Vector $[^B r_{B_C}^{B_i}]$ represents the vector of the attached point $B_i$ with respect to the center $B_C$ at frame {B}, and similarly, vector $[^P r_{P_C}^{P_i}]$ represents the vector of the attached point $P_i$ with respect to the center $P_C$ at frame {P}. They can be written as formulas (3) and (4):

$$[^B r_{B_C}^{B_i}] = [r_B \cos(\lambda_i)\ r_B \sin(\lambda_i)\ 0]^T, i=1\sim6 \quad (3)$$

$$[^P r_{P_C}^{P_i}] = [r_P \cos(\Lambda_i)\ r_P \sin(\Lambda_i)\ 0]^T, i=1\sim6 \quad (4.)$$

As illustrated in FIG. 4, the orientation of frame {P} with respect to frame {B} is specified by the following sequence of rotations. Firstly, by rotating frame {B} about axis $z_P$ with an angle $\theta_x$ (Yaw), and then rotating about the new axis $y_P$ with an angle $\theta_y$ (Pitch), finally rotating about the new axis $x_P$ with an angle $\theta_z$ (Roll), thus, the orientation transformation matrix can be derived as:

$$[R_P] = \begin{bmatrix} C_{\theta_y} C_{\theta_x} & S_{\theta_z} S_{\theta_y} C_{\theta_x} - C_{\theta_z} S_{\theta_x} & C_{\theta_z} S_{\theta_y} C_{\theta_x} + S_{\theta_z} S_{\theta_x} \\ C_{\theta_y} S_{\theta_x} & S_{\theta_z} S_{\theta_y} S_{\theta_x} + C_{\theta_z} C_{\theta_x} & C_{\theta_z} S_{\theta_y} S_{\theta_x} - S_{\theta_z} C_{\theta_x} \\ -S_{\theta_y} & S_{\theta_z} C_{\theta_y} & C_{\theta_z} C_{\theta_y} \end{bmatrix} \quad (5.)$$

where $C_{\theta_x} \triangleq \cos(\theta_x), S_{\theta_x} \triangleq \sin(\theta_x)$.

The position vector of the apex $P_i$ relative to $B_C$ is $$[^B r_{B_C}^{P_i}] = [^B r_{B_C}^{P_C}] + [^B r_{P_C}^{P_i}] = [^B r_{B_C}^{P_C}] + [R_P][^P r_{P_C}^{P_i}] \quad (6.)$$

The length $L_i$ of each leg is defined by $$L_i = \|^B r_{B_i}\| = \sqrt{q_{ix}^2 + q_{iy}^2 + q_{iz}^2} \quad (7.)$$

Figure 5A:
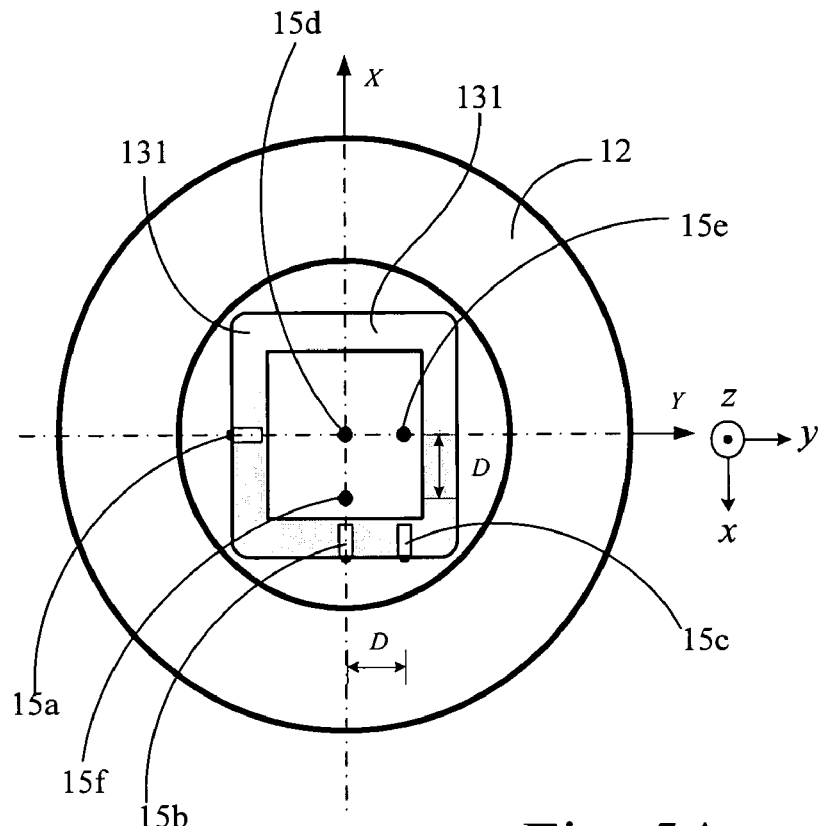
FIGS. 5A and 5B show a partial top view and front view of the nanoscale motion apparatus of FIG. 2.
Figure 5B:
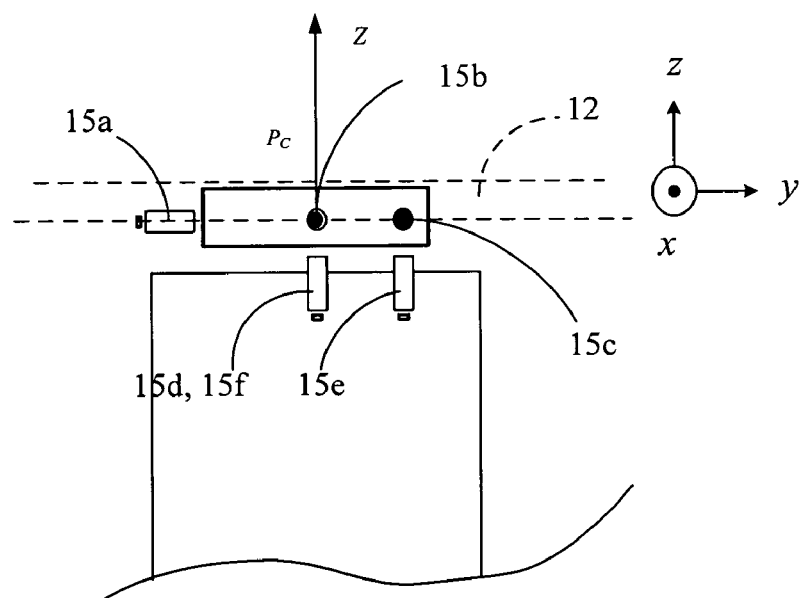

FIGS. 5A and 5B show a partial top view and front view of the nanoscale motion apparatus 1, respectively. As illustrated in FIGS. 5A and 5B, in the XY plane, nanosensor 15$a$ is employed along the y axis, nanosensor 15$b$ is employed along the x axis, and nanosensor 15$c$ is employed with a distance D away from nanosensor 15$b$ and in the direction parallel to the y axis. Similarly, in the YZ and ZX plane, nanosensor 15$d$ is located at the center, nanosensor 15$e$ and 15$f$ are employed with a distance D away from the center and along the y and x axis respectively. Thus, nanosensor 15$b$ and 15$c$ are in charge of measurement in the X direction, nanosensor 15$a$ for the Y direction, and nanosensors 15$d$, 15$e$, 15$f$ for the Z direction.

Figure 6A:
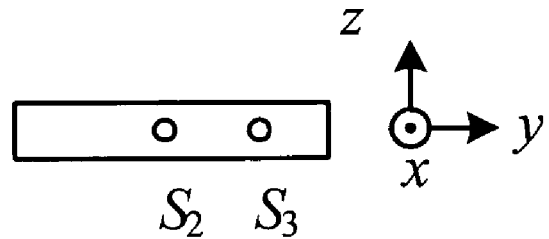
FIG. 6A-6C show front view, left side view, and top view of the protrusion of the measurement plate in accordance with the present invention.
Figure 6B:
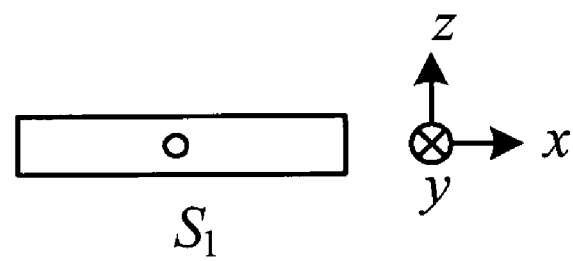
Figure 6C:
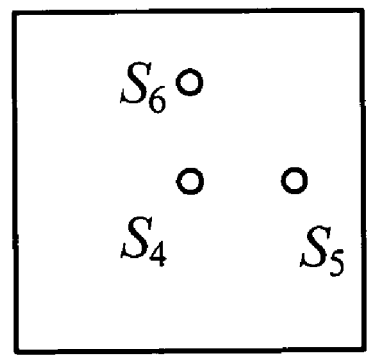
Figure 7A:
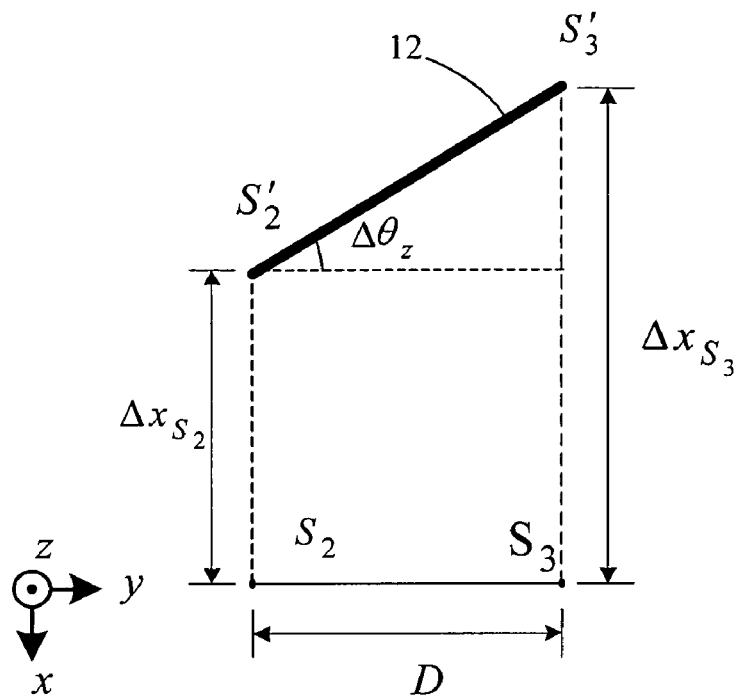
FIG. 7A-7E show geometric relation of measured parameters by using the sensing device of the present invention.
Figure 7B:
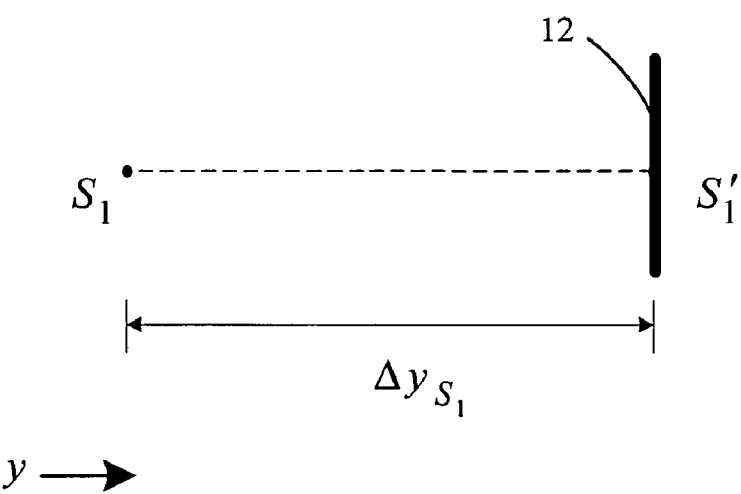
Figure 7C:
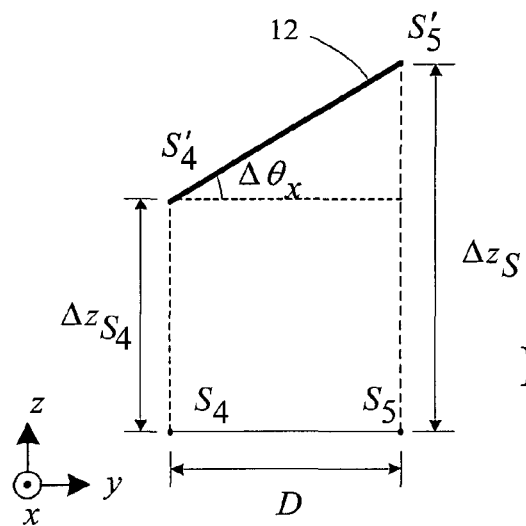
Figure 7D:
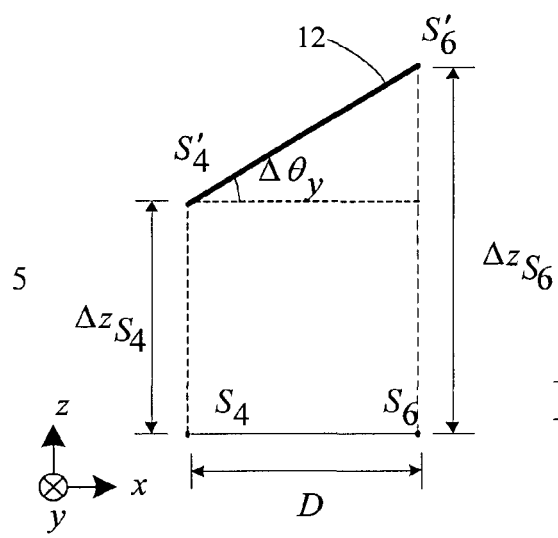
Figure 7E:
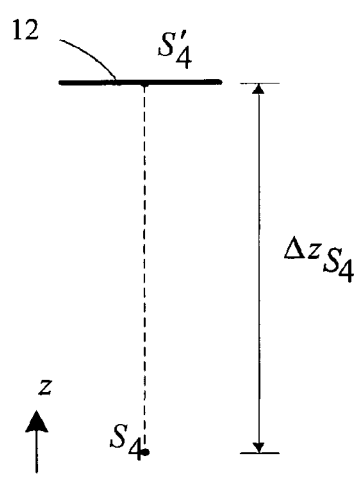

FIG. 6A-6C show front view, left side view, and top view of the protrusion 141 of the measurement plate 14 (shown in FIG. 2). FIG. 6A-6C also indicates the measure points $S_1$-$S_6$ to be measured by the nanosensors 15$a$-$f$ correspondingly. The Cartesian coordinate system (as shown in FIG. 4) with the origin (Pc) of the movable platform 12 can be defined, which also may be the center of the measurement plate 14. The x, y, z axis of the protrusion 141 is parallel to the X, Y, Z axis of the movable platform 12, respectively.

Please also refer to FIG. 7A-7E, which show an example of geometric relation of measured parameters by using the sensing device of the present invention. While the nanoscale motion apparatus moves (i.e. the movable platform moves relative to the fixed base), for example, the geometric relation with respect to the measurement direction X is shown in FIG. 6A. The displacement $\Delta x$ along the x axis is measured via nanosensor 15$b$ at the measure point $S_2$, i.e., $\Delta x = \Delta x_{S_2}$. The orientation angle $\Delta\theta_z$ is computed by the trigonometric relationship of the difference between the measured $\Delta x_{S_2}$ and $\Delta x_{S_3}$ via nanosensors 15$b$ and 15$c$ at the measure points ($S_2$, $S_3$) and the predefined D. As shown in FIG. 6B, the displacement $\Delta y$ along the y axis is measured via nanosensor 15$a$ at the measure point $S_1$, i.e., $\Delta y = \Delta y_{S_1}$. In FIG. 6C, the displacement $\Delta z$ along the z axis is measured via nanosensor 15$d$ at the measure point $S_4$, i.e., $\Delta z = \Delta z_{S_4}$. The orientation angle $\Delta\theta_x$ and $\Delta\theta_y$ is computed by the trigonometric relationship of the difference between the measured $\Delta z_{S_4}$ and $\Delta z_{S_5}$ as well as $\Delta z_{S_4}$ and $\Delta z_{S_6}$ via nanosensors 15$d$ and 15$e$ at the measure points ($S_4$, $S_5$) and ($S_4$, $S_6$) and the predefined D respectively.

By use of the measured data, the parameters ($\Delta x$, $\Delta y$, $\Delta z$, $\Delta\theta x$, $\Delta\theta y$, $\Delta\theta z$) of the moving platform are obtained and listed in Table 1.

TABLE 1

Measures of each measurement direction

| Δ | Measurement direction X | Measurement direction Y | Measurement direction Z |
|---|---|---|---|
| x | $\Delta x_{S_2}$ | N/A | N/A |
| y | N/A | $\Delta y_{S_1}$ | N/A |
| z | N/A | N/A | $\Delta z_{S_4}$ |
| $\theta_x$ | N/A | N/A | $\tan^{-1}\dfrac{\Delta z_{S_5} - \Delta z_{S_4}}{D}$ |
| $\theta_y$ | N/A | N/A | $\tan^{-1}\dfrac{\Delta z_{S_6} - \Delta z_{S_4}}{D}$ |
| $\theta_z$ | $\tan^{-1}\dfrac{\Delta X_{S_3} - \Delta X_{S_2}}{D}$ | N/A | N/A |

According to the sensing device of the present invention, it is much easier to obtain the above computation.

Figure 8:
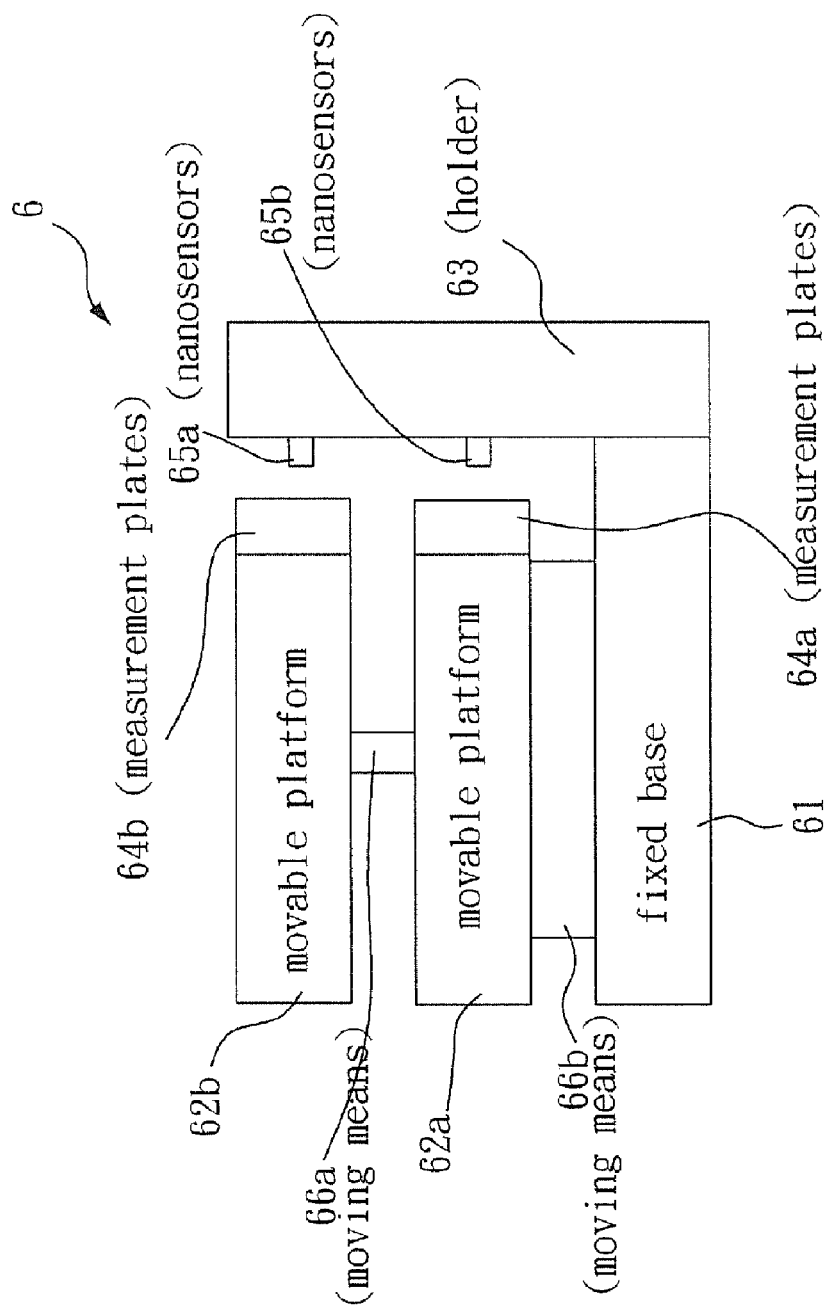
FIG. 8 shows a serial mechanism of the nanoscale motion apparatus.

In another embodiment, the nanoscale motion apparatus can be a serial mechanism. Please refer to FIG. 8. The serial mechanism of the nanoscale motion apparatus 8 comprises a fixed base 61 and two movable platforms 62a and 62b. The means 66a and 66b for moving the movable platforms 62a and 62b connected between the fixed base 61 and the movable platforms 62a and 62b may be tracks. The holder 63 of the sensing device is mounted on the fixed base 61. The nanosensors 65a and 65b are configured on the holder 63. The measurement plates 64a and 64b are mounted on the movable platforms 62a and 62b respectively, wherein the measurement plates 64a and 64b can be sensed by the nanosensors 65a and 65b so as to measure the corresponding variation between the fixed base 61 and the movable platforms 62a and 62b.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

That which is claimed is:

1. A sensing device for measuring a position of a nanoscale motion apparatus having a fixed base, a movable platform, and means for moving the movable platform connected between the fixed base and the movable platform, the sensing device comprising:
   a holder mounted on the fixed base;
   at least two nanosensors configured on the holder; and
   a measurement plate mounted on the movable platform, wherein the measurement plate is sensed by the nanosensors so as to measure the corresponding variation between the fixed base and the movable platform,
   wherein the holder comprises a base portion fixed on the fixed base and a receiving portion fixed on the base portion, and
   wherein the measurement plate comprises a protrusion, and the receiving portion comprises an indentation for receiving the protrusion without touching each other.

2. The sensing device of claim 1, wherein the nanosensors are capacitance probes.

3. The sensing device of claim 1, wherein the means for moving the movable platform comprises six legs driven by piezoelectric actuators.

4. The sensing device of claim 3, wherein the nanosensors sense with six degrees of freedom.

5. The sensing device of claim 3, wherein the nanoscale motion apparatus is a parallel mechanism.

6. The sensing device of claim 5, wherein the nanoscale motion apparatus is a Stewart Platform.

7. The sensing device of claim 1, wherein the nanoscale motion apparatus is a serial mechanism.

8. The sensing device of claim 1, wherein the receiving portion comprises at least two holes corresponding to the nanosensors.

* * * * *